July 19, 1938.    E. MARTIN    2,124,351
PROPELLER
Filed June 28, 1935    2 Sheets-Sheet 1
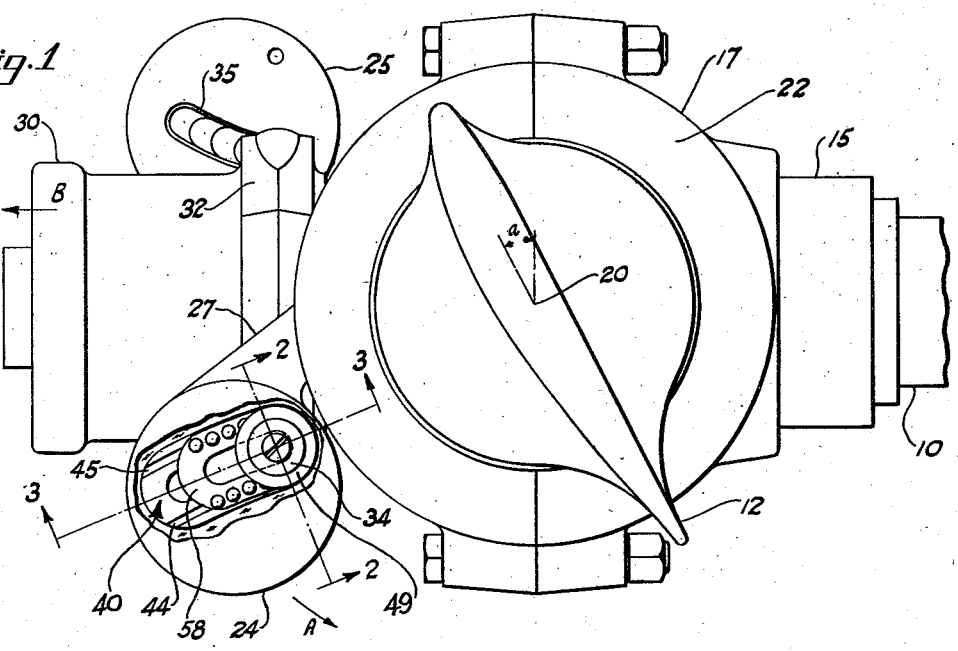
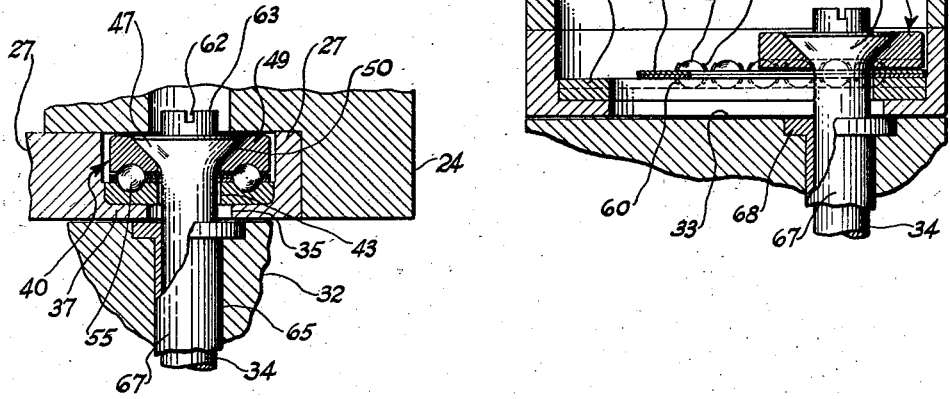
INVENTOR.
Erle Martin
BY Harris G. Luther
ATTORNEY July 19, 1938. E. MARTIN 2,124,351
PROPELLER
Filed June 28, 1935 2 Sheets-Sheet 2
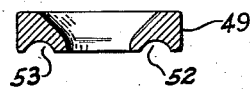
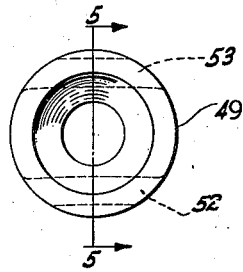
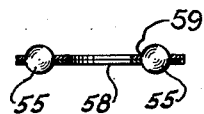
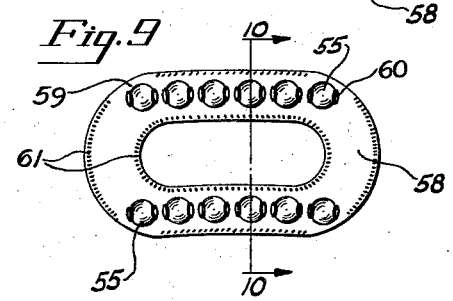
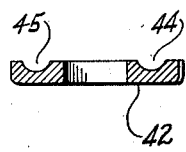
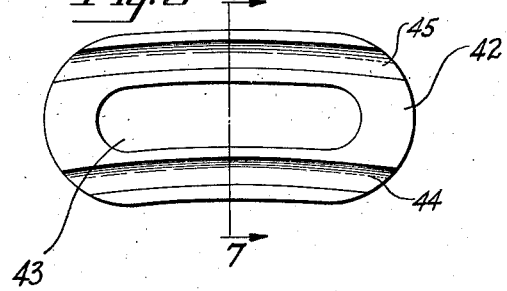
INVENTOR.
Erle Martin
BY Harris G. Luther
ATTORNEY Patented July 19, 1938

2,124,351

UNITED STATES PATENT OFFICE 2,124,351

PROPELLER

Erle Martin, West Hartford, Conn., assignor to United Aircraft Corporation, East Hartford, Conn., a corporation of Delaware Application June 28, 1935, Serial No. 28,888

8 Claims. (Cl. 170—163)

This invention relates to improvements in propellers and has particular reference to a propeller in which the blade is subject to angular adjustment to produce an operating condition of constant engine speed, and is manually controllable so that the engine speed may be varied at the will of the operator.

An object of the invention lies in the provision of an improved anti-friction bearing between the manual control means and the adjusting means.

Other objects and advantages will appear as the description proceeds.

In the accompanying drawings I have illustrated a suitable mechanical embodiment of what is now considered to be the preferred form of the invention. The drawings, however, are to be taken for the purpose of illustration only and not as limiting the invention, the scope of which is to be measured entirely by the scope of the appended claims.

In the drawings, Fig. 1 is a top plan view of a controllable propeller constructed according to the idea of this invention, a portion thereof being broken away to better illustrate the construction thereof. Fig. 2 is a cross sectional view on the line 2—2 of Fig. 1. Fig. 3 is a cross sectional view on the line 3—3 of Fig. 1. Fig. 4 is a plan view of a bearing member constructed according to the idea of this invention. Fig. 5 is a cross sectional view on the line 5—5 of Fig. 4. Fig. 6 is a plan view of a bearing member cooperating with the bearing member illustrated in Fig. 4. Fig. 7 is a cross sectional view on the line 7—7 of Fig. 6. Fig. 8 is an elevational view of a retainer for the anti-friction ball bearings cooperating with the bearing members illustrated in Figs. 4 and 6. Fig. 9 is a plan view of the retainer and ball bearings illustrated in Fig. 8, and Fig. 10 is a cross sectional view on the line 10—10 of Fig. 9.

Referring to the drawings in detail the numeral 10 indicates a drive shaft of a motor such as an internal combustion engine. The drive shaft supports and drives a propeller having blades, one of which is indicated at 12, adjustably supported upon the drive shaft by means of a spider 15 and a barrel 17, as is clearly illustrated in Patent No. 2,032,255, of Frank W. Caldwell, issued February 25, 1936. The patent referred to shows the propeller blade mounted upon a spider as indicated at 15 for substantially frictionless rotation about its axis 20 and retained upon the spider against the action of centrifugal force by the barrel member indicated at 17 which is provided with a flange 22 overlying a cooperating flange formed upon the root of the propeller blade.

The angle of the propeller blades is adjusted in one direction by means of centrifugally acting counterweights 24 and 25, one counterweight being attached to the root or base portion of each blade and operating through the effect of centrifugal force upon rotation of the propeller to increase the angle of the blade to which it is attached. As the two counterweights are exactly similar in all respects a detailed description of only one of them is considered sufficient for the purpose of this disclosure. The counterweight 24 comprises a member of preferably cylindrical or spherical shape attached to the root of the blade 20 by means of a counterweight bracket 27 in such a manner that the counterweight is disposed in front of the propeller and is displaced in a direction opposite to the direction of rotation of the propeller from a plane passing through the axis of the drive shaft 10 and the axis 20 of the propeller blade 12. As the effect of centrifugal force upon a rotating object displaced from the axis of rotation tends to increase the distance of the object from the axis of rotation, it will be apparent that upon rotation of the propeller then will be a tendency for the counterweight 24 to move along a radial line passing through the center of gravity of the counterweight and through the axis of the shaft 10. This radial line diverges from the radial line constituting the axis 20 of the propeller blade 12 in such a manner as to cause a force to be set up substantially tangential to the circle of rotation of the counterweight about the axis of the shaft 10 which force acts to cause the counterweight to rotate about the axis 20 of the blade 12 in a direction opposite to the direction that the blade tends to rotate or in the direction of the arrow A on Figure 1. As the counterweight bracket 27 is non-rotatably secured to the base or root portion of the blade 12, this force in the direction of the arrow A will tend to increase the angle alpha between the longitudinal axis of the blade section and the plane of rotation of the major axis 20 of the blade; the angle alpha being commonly referred to as the pitch or blade angle. While the centrifugal force acting upon the counterweight 24 has a useful component in the direction of the arrow A operating to adjust the blade angle to maintain constant engine speed, it also has a component in a radial direction which produces in the counterweight a turning moment about an axis located in the plane of the connection of the bracket member 27 to the base of the propeller blade and disposed at right angles to the axis 20. The counterweight must be supported against this turning moment and this is accomplished in a manner to be presently described.

The means for adjusting the blade angle of the propeller blades 12 comprises a cylindrical member 30 slidably mounted upon a forward extension of the shaft 10 to move in opposite directions coincident with the axis of the drive shaft in response to changes in the pressure of fluid supplied thereto by suitable hydraulic means controlled by the person operating the engine or by suitable automatic or speed responsive means. This cylinder 30 is provided at its rearward end with a pair of radially extending arms, one of which is indicated at 32, and to these arms 32 are secured tangentially extending pins as indicated at 34, the projecting ends of which pass through arcuate cam slots 35 provided in the counterweight brackets 27 so that upon the movement of the cylinder 30 in the direction of the arrow B indicated in Figure 1 the pins 34 sliding in the cam slots 35 will overcome the effect of the components of the centrifugal force acting on the counterweights 24 and 25 tending to move the counterweights in a direction to increase the blade angle of the propeller blades and will move the counterweights toward each other in a direction to decrease the blade angle alpha of the propeller. While the connections comprising the arms 32 and pins 34 are effective to overcome the tangential component of the centrifugal force acting on the counterweights and move the counterweights 24 and 25 to adjust the blade angle of the propeller, it is among the objects of this invention to utilize this same connection to support the counterweights against that radial component of centrifugal force which produces a turning moment about an axis perpendicular to the axis 20 as described above.

The cam slot 35 extends through the counterweight bracket 27 from the side thereof adjacent to the arm 32 and for a distance sufficient to provide the bearing 37 with sufficient strength to resist the centrifugal force imposed upon the counterweight and the free end of its bracket by reason of the rotation of the drive shaft 10, and is then enlarged to receive a ball bearing generally indicated at 40.

This ball bearing comprises, an elongated ball race member 42, preferably made of hardened steel, seated upon the inner face of the bearing element 37 and provided with a slot 43 coincident with or parallel to the slot 35 and also provided in its exposed face with a pair of grooves 44 and 45 of partly circular cross section arranged one upon each side of the slot 43 and spaced therefrom preferably about one-half of the distance from the edge of the slot to the adjacent outer edge of the member 42 and extending for the entire length of the elongated member 42. The radially outer end of the pin 34 is provided with an inverted cone shaped head 47 against which bears a circular ball race 49 provided with an aperture to receive the pin 34, said aperture being beveled as indicated at 50 to receive the cone shaped head 47 of the pin. The surface of the member 49 opposite the bevel 50 is provided with grooves 52 and 53 of partly circular cross section, as clearly illustrated in Fig. 5, having a longitudinal curvature of the grooves 44 and 45 respectively, provided in the outer surface of the member 42. A plurality of bearing balls as indicated at 55 are disposed in the grooves 44 and 45 of the member 42, some of these balls being at all times interposed between the members 42 and 49 to provide an anti-friction bearing for the sliding movements of the member 49 with respect to the member 42. The balls 55 are mounted in a retaining cage 58, preferably but not necessarily, formed of two pieces of sheet metal secured together by suitable means such as spot welding or line welding as indicated at 61 and provided with apertures 59 for receiving the balls, and tongues 60 partly surrounding the balls to retain them in their respective apertures. The cage 58 is materially shorter than the member 42 being preferably one half the length of such bearing member so that the pin 34 may traverse the entire length of the slot 35 before the end of the cage comes into contact with the adjacent end of the bearing receiving opening provided in the counterweight support 27.

The pin 34 is screw threaded into the arm 32 and for this purpose is provided at its outer end with a slot 62 formed in an upstanding boss 63 by means of which a suitable tool such as a screw driver may be applied to the pin to thread it securely into a screw threaded aperture 65 provided in the arms 32. Preferably the arm 32 is formed of a relatively light weight alloy such as an aluminum alloy and if desired the aperture 65 may be lined with a sleeve member 67 of hardened material provided at its outer end with a radial flange or bead 68 to prevent wear between the pin and the arm and between the arm and the adjacent surface of the counterweight bracket. The ball bearing 40 is preferably set up with a slightly loose fit so that there will be no initial bearing loads between the parts.

This construction provides a ball bearing which is capable of taking lateral as well as axial thrust. The ability of the ball bearing to take lateral thrust provides for frictionless movement of the counterweights about the axis 20 upon reciprocation of the cylinder 30 and the ability of the ball bearing to take axial thrust provides for frictionless movement of the pin 34 relative to the counterweight bracket 27 while the pin is absorbing the thrust placed upon it by the radial component of the centrifugal force acting upon the respective counterweights 24 or 25. The grooves 52 and 53 are provided with slightly rounded ends so that as the member 49 rides over the balls 55, the balls will be directed into the grooves and there will be no tendency for the member to force the balls out of their position in the cage 58. The cylinder 30 carrying arms 32 is free to rotate about its axis but is held against rotation by the bearings 40 which exert diametrically opposite balanced forces on the cylinder and are constrained by the counterweight brackets to move in flat arcuate paths. These forces place bending and tension loads on the pins 34 which maintain the cylinder 30 against rotation and cause the counterweights to move relative to a plane passing through the axis of the shaft 10 and the axis 20 of the propeller blades as the cylinder 30 moves along the shaft 10 to alter the blade angle of the propeller in response to manual control.

While I have illustrated my invention as applied to a two bladed propeller it is to be understood that it may be applied to propellers having any desired number of blades. In all cases a separate counterweight, counterweight bracket, cylinder arm, pin and bearing will be provided for each blade of the propeller.

From the above description, it will be observed that I have provided in a propeller, subject to controllable adjustment, anti-friction bearing means between the controlling means and the adjusting means such that the controlling means may be readily and easily moved to secure the desired adjustment regardless of the incident effect of the adjusting means and in which at the same time the adjusting means is supported by the controlling means against that component of centrifugal force acting upon the adjusting means which tends to carry the centrifugally acting adjusting means away from their operative association with the propeller blades.

While I have illustrated and described a particular mechanical embodiment which my invention may take, it is to be understood that the invention is not limited to the specific embodiment so illustrated and described, but that such changes in the size, shape and arrangement of parts may be resorted to as come within the scope of the appended claims.

Having now disclosed my invention so that others skilled in the art may clearly understand the same, what I desire to secure by Letters Patent is as follows:

1. In a controllable propeller having blades journalled for angular adjustment about their axes, adjusting means secured to each blade and movable therewith for increasing the blade angle, and power actuated control means for controlling the action of said adjusting means, an anti-friction connection between said adjusting means and said control means comprising, flat race members slidable longitudinally with respect to each other and secured to said adjusting means and said control means respectively, and a group of anti-friction elements disposed between said race members and extending beyond one of said race members in the direction of relative movement therebetween.

2. In a controllable propeller having blades journalled for angular adjustment about their axes, adjusting means secured to each blade and movable therewith for increasing the blade angle, and control means for controlling the action of said adjusting means, an anti-friction connection between said adjusting means and said control means comprising, an elongated flat race member carried by said adjusting means, a tension pin carried by said control means extending through a portion of said adjusting means and said elongated race carried thereby, a flat race member carried by said pin and movable relative to the race carried by said adjusting means in the direction of the length thereof, and anti-friction elements disposed between said race members to roll in the direction of relative movement therebetween.

3. In a controllable propeller having blades journalled for angular adjustment about their axes, means secured to each blade and movable therewith for adjusting the blade angle, and control means for controlling the action of said adjusting means, an anti-friction connection between said adjusting means and said control means comprising, an elongated flat race member carried by said adjusting means, a pin carried by said control means and extending through elongated slots provided in said adjusting means and in the race member carried thereby, a substantially circular race member carried by said pin to react with said first mentioned race member and movable relative thereto in the direction of the length thereof, a pair of grooves in said race member carried by said adjusting means disposed one upon each side of the slot provided in said race member and extending the length of said race member, a pair of corresponding grooves in said pin carried race member, and a plurality of anti-friction balls disposed to roll in said grooves in the direction of relative movement between said race members.

4. In a controllable propeller having blades journalled for angular adjustment about their axes, means secured to each blade and movable therewith for adjusting the blade angle, and control means for controlling the action of said adjusting means, an anti-friction connection between said adjusting means and said control means comprising, an elongated flat race member carried by said adjusting means, a pin carried by said control means and extending through slots provided in said adjusting means and said race member, a substantially circular race member carried by said pin and movable with respect to the race member carried by said adjusting means in the direction of the length thereof, corresponding grooves in said race members extending for the length thereof in the direction of relative movement, anti-friction balls disposed in said grooves to roll therein and a retainer for said balls comprising, a flat plate having ball receiving apertures therein and means for retaining said balls in said apertures.

5. In a propeller having blades journalled for angular adjustment about their axes and having centrifugal means to increase the angle of said blades and power actuated control means for controlling the action of said centrifugal means in which said centrifugal means is provided with an enlarged elongated depression therein and an elongated cam slot extending through the bottom of said depression, means providing an anti-friction connection between said control means and said centrifugal means comprising, an elongated ball race supported upon the bottom of said depression and provided with an aperture therethrough coextensive with said cam slot, an arm on said control means, a pin fixed in said arm and extending through said cam slot and said elongated ball race carried by the free end of said pin and movable with respect to said elongated ball race in a direction along the length of said cam slot, cooperating grooves in said ball races upon opposite sides of said cam slot, and a plurality of anti-friction balls in said grooves.

6. In a propeller having blades journalled for angular adjustment about their axes and having centrifugal means to increase the angle of said blades and power actuated control means for opposing the action of said centrifugal means in which each centrifugal means is provided with an enlarged elongated depression therein and an elongated cam slot extending through the bottom of said depression, means providing an anti-friction connection between said control means and said centrifugal means comprising, an elongated ball race supported upon the bottom of said depression and provided with an aperture therethrough coextensive with said cam slot, an arm on said control means, a pin fixed in said arm and extending through said cam slot and said elongated ball race into said depression, a substantially circular ball race carried by the free end of said pin and movable with respect to said elongated ball race in a direction along the length of said cam slot, cooperating grooves in said ball races upon opposite sides of said cam slot, a plurality of anti-friction balls in said grooves, and a cage member for retaining said balls in position in said grooves.

7. In a controllable propeller, propeller blades journalled for rotative adjustment about their axes, a counterweight fixed to each blade for rotating said blade in a direction to increase the blade angle, a hydraulic cylinder movable in opposite directions to control the blade angle of said propeller in opposition to said counterweights, and means connecting said cylinder with said counterweights said means comprising, arms on said cylinder spaced around the circumference thereof in accordance with the angular distance between the blades of said propeller, a pin on each arm extending through a cam slot provided in the associated counterweight, an elongated flat bearing carried by each counterweight, a bearing carried on the free end of each pin overlying the elongated bearing carried by the respective counterweight, and antifriction elements between said superimposed bearings.

8. In a controllable pitch propeller having blades journaled for angular adjustment about their axes, adjusting means secured to each blade and movable therewith for increasing the blade angle, and control means for controlling the action of said adjusting means, an anti-friction connection between said adjusting means and said control means comprising, an elongated flat race member carried by one of said means, a tension pin carried by the other of said means extending through a portion of said one means and the elongated race member carried thereby, a flat race member carried by said pin and movable relative to said elongated race member in the direction of the length thereof, and antifriction elements disposed between said race members to roll in the direction of relative movement therebetween.

ERLE MARTIN.